UNITED STATES PATENT OFFICE.

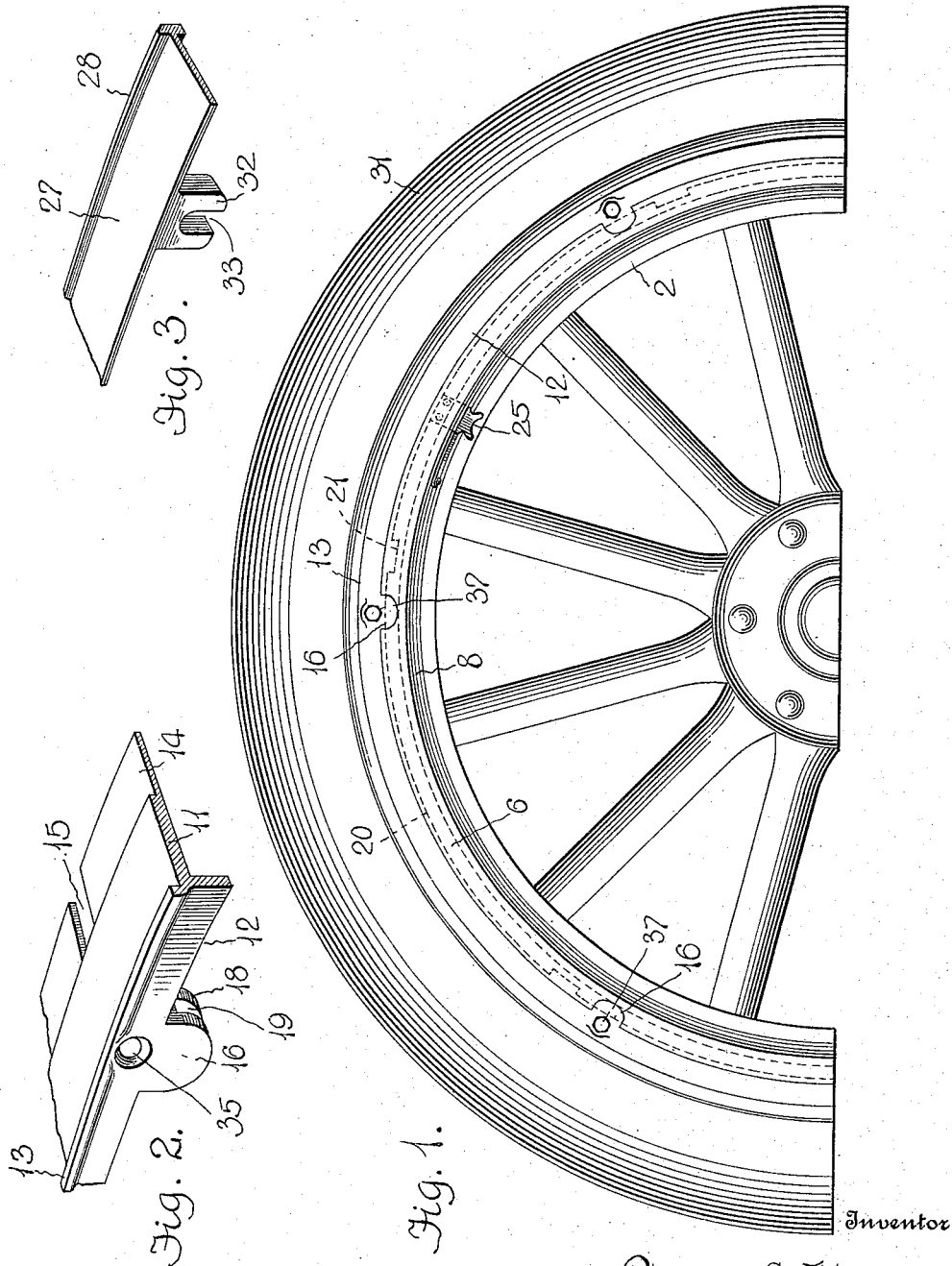

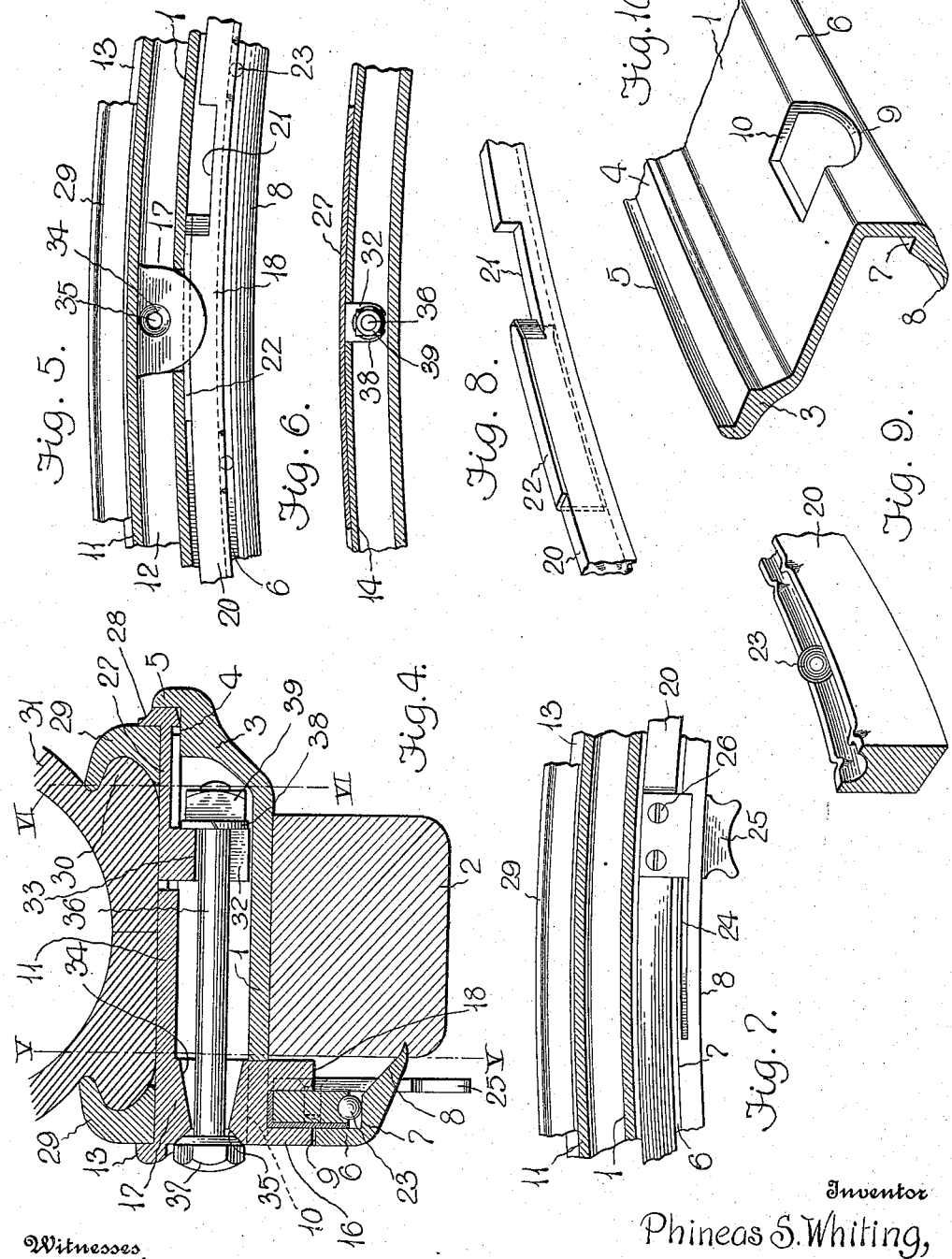

PHINEAS S. WHITING, OF AKRON, OHIO, ASSIGNOR TO MARIA E. WHITING, OF WAYNE COUNTY, MICHIGAN.

DEMOUNTABLE RIM.

1,171,373.  Specification of Letters Patent.  Patented Feb. 8, 1916.

Application filed December 26, 1914. Serial No. 879,178.

*To all whom it may concern:*

Be it known that I, PHINEAS S. WHITING, a citizen of the United States of America, residing at Akron, in the county of Summit and State of Ohio, have invented certain new and useful Improvements in Demountable Rims, of which the following is a specification, reference being had therein to the accompanying drawings.

My invention aims to provide a demountable rim for vehicle wheels wherein simple and effective means are employed for detachably holding a rim upon a wheel, also novel means for detachably holding a tire shoe or casing upon a rim. The means employed for retaining a rim upon a wheel is operable without the use of a tool, and after a rim has been removed from a wheel a small socket or spanner wrench is used for releasing parts of the rim whereby a tire shoe or casing can be removed or opened.

My invention further aims to accomplish the above and other results by a durable and efficient mechanical construction that will be hereinafter specifically described and then claimed, and reference will now be had to the drawing, wherein—

Figure 1 is a side elevation of a portion of a vehicle wheel provided with a rim in accordance with this invention; Fig. 2 is a perspective view of a portion of the main rim member; Fig. 3 is a similar view of another rim member; Fig. 4 is a cross sectional view of a demountable rim in accordance with this invention; Fig. 5 is a longitudinal sectional view taken on the line V—V of Fig. 4; Fig. 6 is a similar view taken on the line VI—VI of Fig. 4; Fig. 7 is a longitudinal sectional view taken on or about the line V—V of Fig. 4, illustrating a finger piece for releasing the rim of a wheel; Fig. 8 is a perspective view of a portion of a locking ring; Fig. 9 is an enlarged perspective view of a portion of the ring illustrating a ball bearing, and Fig. 10 is a perspective view of a portion of a felly band.

The present invention includes structural elements disclosed in my pending application filed Nov. 2, 1914, Serial No. 869,819.

The reference numeral 1 denotes a felly band in the form of an annulus or band that is shrunk or otherwise mounted upon a wheel felly 2, said member being of a greater width than the felly whereby the side edges thereof project from the sides of the felly. The inner side edge of the felly band 1 has an upstanding flange 3 terminating in a seat 4 and a rib 5, said seat coöperating with said rib in holding a sectional rim, as will hereinafter appear. The outer side edge of the felly band 1 has a depending flange 6 terminating in a rail 7 and a sharp edge 8, said sharp edge engaging in the outer wall of the felly 2 and coöperating therewith in forming a channel or annular compartment that incloses the locking device of the rim. The flange 6 has spaced slots 9 communicating with slots 10 in the felly band 1, the purpose of which will presently appear.

Detachably mounted upon the felly band 1 is an outer rim member 11 provided with a depending flange 12 that engages the outer edge of the felly band 1. The inner edge of the member 11 rests upon the annular seat 4 and this inner edge is cut away to provide an annular seat 14 and slots 15, the slots 15 being spaced in the annular seat. The outer edge of the rim member 11 has a peripheral rib 13 and the flange 12 of said member is provided with spaced inwardly projecting lugs 16. The inner side of the flange 12, at each lug, has a boss 17 provided with a lug 18 in parallelism with the lug 16, said lugs forming a slot 19, as best shown in Figs. 2 and 4. The slots 9 and 10 of the felly band 1 provide clearance for the lugs 16 and 18 of the outer rim member 11 and the lugs 16 are adapted to fill and close the slots 9 and thereby prevent dirt and foreign matter from entering the channel or annular compartment between the felly 2 and the flange 6 of the felly band 1.

Housed within the channel or annular compartment and shiftable circumferentially thereof is a locking ring 20, said ring being movable in the slot 19 and of less width than said slot, whereby the locking ring can be easily shifted. The locking ring has the periphery thereof provided with spaced recesses 21 providing clearance for the innermost lug 18 as the outer rim member is placed upon the felly band. Adjacent an end wall of each recess of the locking ring and upon the outer side thereof is an enlargement 22, serving two purposes. First, the enlargements engage the inner side of the flange 6 and maintain the locking ring 20 in frictional contact with said flange, thereby reducing wear and tear upon the locking ring to a minimum and by reason of the small frictional contact with the flange permitting of the locking ring being easily and quickly shifted within the channel or annular compartment. In other words, the locking ring has just sufficient contact to guide it in its movement, otherwise the friction between the flange 6 and the locking ring would be such as to involve a laborious task when shifting the ring. Second, the enlargements 22 coöperate with the body of the locking ring in completely filling the slots 19 and besides preventing withdrawal of the outer rim member 11, said member is prevented from chattering or shifting upon the felly band 1.

Interposed between the locking ring 20 and the rail 7 of the flange 6 is a plurality of anti-frictional bearings 23, preferably in the form of balls held in spaced relation by the inner edge of the locking ring shown in Fig. 9.

In order that the locking ring 20 can be manually shifted without resorting to the use of special tools, the flange 6 has a longitudinal slot 24 and extending through said slot is a hand or finger piece 25, which is secured to the inner side of the locking ring by screws 26 or other fastening means. The end walls of the slots 24 limit the movement of the finger piece 25 therein and consequently the shifting of the locking ring 20, and by moving the finger piece from one end of the slot 24 to the opposite end the enlargements 22 of the locking ring are either moved into the slots 19 or out of the slots.

Detachably mounted upon the annular seat 14 of the outer rim member is an inner rim member 27. The outer edge of the inner rim member 27 has a peripheral rib 28 adapted to be engaged by the rib 5 of the felly band 1. The peripheral rib 28 of the inner rim member and the peripheral rib 13 of the outer rim member coöperate in retaining reversible clamping members 29 in engagement with the clencher edges 30 of a tire shoe or casing 31. The clamping members 29 are reversible in order to be used in connection with the tire shoe or casing of a type other than that shown in Fig. 4. The inner edge of the inner rim member 27 is provided with spaced inwardly projecting lugs 32 that are bifurcated or forked, as at 33. The slots 15 in the annular seat 14 of the outer rim member 11 provide clearance for the lugs 32 and said lugs are adapted to aline with the bosses 17 at the outer edge of the outer rim member 11. The bosses 17 are provided with tapering openings 34 in communication with tapering openings 35 in the flange 12, the taper of the openings 35 being the reverse of the taper of the openings 34 and the openings 34 of greater length than the openings 35. Extending through these openings are bolts 36 having heads 37 seated in the tapering openings 35 of the flange 12. The threaded end of each bolt 36 extends through the bifurcation of the lug 32 and is provided with a spring washer 38 and a nut 39. The spring washer 38 is of the Verona type and is interposed between the nut 39 and the lug 32.

In operation, after the inner and outer rim members are assembled and held by the bolts 36, the tire is inflated and in this condition constitutes a demountable rim. After the demountable rim is placed upon the felly band and locked in engagement therewith, the bolt heads 37 are turned a quarter or a half revolution, counterclockwise, thereby releasing the outer rim member sufficiently relative to the inner rim member to permit the internal pressure of the tire casing to distend the rim members, causing the inner rim member to become clamped against the felly band and the outer rim member to become clamped against the locking ring and said ring against the felly band. It is therefore apparent that I have devised an air locked demountable rim and when it is desired to remove the demountable rim, it is necessary to rotate the bolts 36 clockwise, shift the locking ring to release the demountable rim, and then remove the rim. The bolts are held in position connecting the inner and outer rim members by reason of the internal pressure of the tire casing. With the demountable rim removed from the wheel, the bolts can be easily swung to release one rim member relative to the other and this operation is facilitated when air is released from the tire casing.

Considerable importance is attached to the fact that the internal pressure of the tire casing 31 upon the inner and outer rim members causes said members to be distended, particularly the inner rim member which is held and sealed against the rib 5 of the felly band. The outer rim member is held against the locking ring and said locking ring against the flange 6 of the felly band, consequently there is a constant air produced pressure that tends to securely lock the inner and outer rim members relative to the felly band.

While in the drawings there is illustrated a preferred embodiment of my invention, it is to be understood that the structural elements are susceptible to such changes, as in the size, shape and manner of assemblage, as fall within the scope of the appended claims.

What I claim is:—

1. In a demountable rim, a felly band, a locking ring shiftable circumferentially of said band, and a circumferentially split rim on said felly band adapted to hold a tire and secured in place by said locking ring with the parts of said rim disposed to be crowded away from each other by pressure of air within said tire, whereby said rim is locked relative to said felly band.

2. A demountable rim comprising an outer annular member, an inner annular rim member seated upon the inner edge of said outer annular rim member and adapted to coöperate therewith in holding a tire, and means shiftable within and circumferentially of said outer rim member adapted to secure said members in place, said members being disposed to be crowded away from each other by pressure of air in the tire to hold said means locked relative to said outer annular rim member.

3. In a demountable rim, an outer rim member having transverse slots, an inner rim member slidable on said outer rim member, bosses forming part of the outer rim member, lugs forming part of the inner member and extending through the slots of said outer rim member and transversely alining with said bosses, and means loosely held by said bosses and extending through said lugs for holding the inner rim member relative to the outer rim member.

4. In a demountable rim, an outer rim member having the inner edge thereof provided with open transverse slots, bosses forming part of said outer rim member and having tapering openings therein, an inner rim member slidable transversely of said outer rim member, bifurcated lugs carried by said inner rim member and extending through the slots of said outer rim member and alining with the bosses of said outer rim member, and bolts loosely held in the tapering openings of said bosses and clamped in the bifurcation of said lugs to retain said inner rim member on said outer rim member.

5. In a demountable rim, a felly band, an outer rim member thereon, a locking ring between said outer rim member and said felly band and shiftable circumferentially thereof, and an inner rim member on said outer rim member and movable transversely thereof, said rim members being distended by internal pressure of the tire casing adapted for mounting on said rim members whereby the outer rim member is held against said locking ring and said locking ring against said felly band, and said inner rim member held against said felly band.

In testimony whereof I affix my signature in presence of two witnesses.

PHINEAS S. WHITING.

Witnesses:
ANNA M. DORR,
KARL H. BUTLER.

Copies of this patent may be obtained for five cents each, by addressing the "Commissioner of Patents Washington, D. C."